United States Patent [19]
Nam

[11] Patent Number: 5,493,341
[45] Date of Patent: Feb. 20, 1996

[54] DIGITAL NON-LINEAR PRE-EMPHASIS/DE-EMPHASIS APPARATUS FOR VIDEO SIGNALS IN A VIDEO SIGNAL RECORDING AND REPRODUCING APPARATUS

[75] Inventor: Seok-hoon Nam, Suwon, Rep. of Korea

[73] Assignee: Samsung Electronics Co., Ltd., Kyungki-do, Rep. of Korea

[21] Appl. No.: 218,935

[22] Filed: Mar. 29, 1994

[30] Foreign Application Priority Data

Mar. 29, 1993 [KR] Rep. of Korea ............... 93-4987

[51] Int. Cl.⁶ .................................... A04N 5/923
[52] U.S. Cl. .................................... 348/613; 358/315
[58] Field of Search .................... 348/613, 618, 348/621, 622; 358/315, 336, 340; 360/65; 333/14

[56] References Cited

U.S. PATENT DOCUMENTS

| | | | |
|---|---|---|---|
| 4,668,988 | 5/1987 | Sasaki et al. | 358/166 |
| 4,849,826 | 7/1989 | Ohta | 358/336 |
| 5,144,434 | 9/1992 | Yamashita | 348/613 |
| 5,276,403 | 1/1994 | Sakamoto | 348/613 |

Primary Examiner—Victor R. Kostak
Assistant Examiner—Nathan J. Flynn
Attorney, Agent, or Firm—Sughrue, Mion, Zinn, Macpeak & Seas

[57] ABSTRACT

A digital non-linear pre-emphasis/de-emphasis apparatus includes a first filter for multiplying an input signal by a first coefficient varying non-linearly according to the amplitude of the input signal, to thereby change the gain of the input signal, and a second filter for multiplying the gain-altered input signal by a second non-linear coefficient according to the gain value of the input signal to thereby change its passband with respect to the input signal. The apparatus changes the frequency response characteristic according to the input signal amplitude and obtains an emphasis amount. Furthermore, the apparatus selectively adds or subtracts the input signal and the emphasis amount according to a received record or reproduction mode signal, to thereby increase the S/N ratio of a VCR system and enhance the stability thereof.

12 Claims, 5 Drawing Sheets

DIGITAL NON-LINEAR PRE-EMPHASIS/DE-EMPHASIS APPARATUS FOR VIDEO SIGNALS IN A VIDEO SIGNAL RECORDING AND REPRODUCING APPARATUS

BACKGROUND OF THE INVENTION

1. Field of the Invention

The present invention relates to a digital non-linear pre-emphasis/de-emphasis apparatus and, more particularly, to a digital non-linear pre-emphasis/de-emphasis apparatus suitable for a system which requires a filter that non-linearly changes the system frequency response characteristic according to the input signal amplitude.

Korean Patent Application No. 93-4987 is incorporated herein by reference for all purposes.

2. Brief Discussion of Related Art

Generally, a non-linear pre-emphasis/de-emphasis apparatus is used for a video cassette recorder (VCR) to enhance the signal-to-noise (S/N) ratio of a high frequency signal during recording and reproduction.

Pre-emphasis is a process by which the higher frequency components of a baseband signal are emphasized prior to recording or transmission to offset loss in the S/N ratio of the high frequency component of the baseband signal decreased during recording/reproduction or transmission/reception. It will be noted that de-emphasis is a process by which the high frequency components emphasized for recording or transmission are restored to their original waveform during reproduction or reception.

In the case of a VCR, the high frequency component of the input signal is emphasized by a non-linear pre-emphasis apparatus during recording while, the emphasized high frequency component is attenuated by means of a non-linear de-emphasis apparatus during reproduction. The operational characteristics of the non-linear pre-emphasis apparatus mirror those of the de-emphasis apparatus, so that signal gain does not change throughout recording and reproduction.

In a VCR wherein analog signals are being processed, the non-linear characteristic of a diode is utilized in constructing the non-linear pre-emphasis/de-emphasis apparatus. This analog non-linear pre-emphasis/de-emphasis apparatus is generally classified into a non-linear pre-emphasis/de-emphasis portion and a main pre-emphasis/de-emphasis portion.

Figure 1:
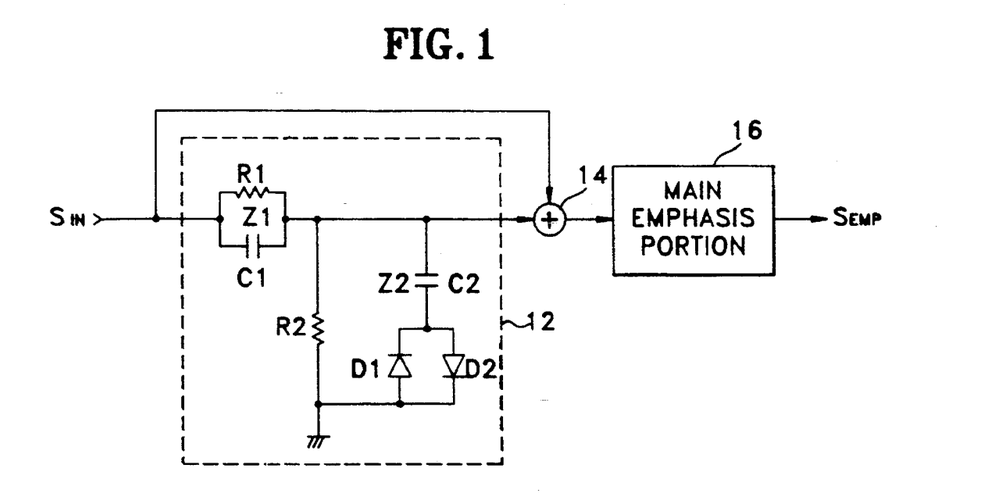
FIG. 1 is a circuit diagram of a conventional analog non-linear pre-emphasis apparatus.

In the first generation of video home system (VHS) format VCRs, a non-linear pre-emphasis/de-emphasis was not used; only the main pre-emphasis/de-emphasis portion was used. Second and third generation VHS format VCRs, in general, include two portions: a non-linear pre-emphasis/de-emphasis portion and a main pre-emphasis/de-emphasis portion. A conventional analog non-linear pre-emphasis apparatus is shown in FIG. 1, in which the apparatus includes a non-linear pre-emphasis portion 12 having a resistor R1 and a capacitor C1 which are connected in parallel with respect to each other to obtain a first impedance value Z1, two diodes D1 and D2 connected in parallel with respect to each other and between a capacitor C2 and ground, capacitor C2 being connected in parallel with a resistor R2, one end of which is grounded, for obtaining a second impedance value Z2. An adder 14 is connected to non-linear pre-emphasis portion 12 for receiving an input signal $S_{IN}$ for adding image signal $S_{IN}$ to the output signal of non-linear pre-emphasis portion 12. A main emphasis portion 16 generates the image signal with improved S/N ratio with respect to the output from adder 14. It will be noted that during operation of non-linear emphasis portion 12 shown in FIG. 1, the non-linear characteristic of diodes D1 and D2 permits conduction of high-amplitude input signal $S_{IN}$, so that capacitor C2 is effectively grounded.

Since first impedance Z1, which is formed by capacitor C1 and resistor R1, and second impedance Z2, which is formed by capacitor C2 and resistor R2, are equal to one another, the output of non-linear pre-emphasis portion 12 becomes flat and constant for the entire operational bandwidth.

On the other hand, when a low-amplitude input signal $S_{IN}$ is applied, diodes D1 and D2 do not conduct and, since they are essentially acting as an open circuit, effectively remove capacitor C2 from non-linear pre-emphasis portion 12.

Accordingly, first impedance Z1, which is formed by capacitor C1 and resistor R1 in non-linear pre-emphasis portion 12, varies with frequency. Adder 14 adds input signal $S_{IN}$ to the output signal of non-linear pre-emphasis portion 12, so that the amplitude of the output signal of adder 14 becomes larger for higher frequency signals so that only the high frequency input signal having a low amplitude is boosted by about 5–6 dB.

Figure 2A:
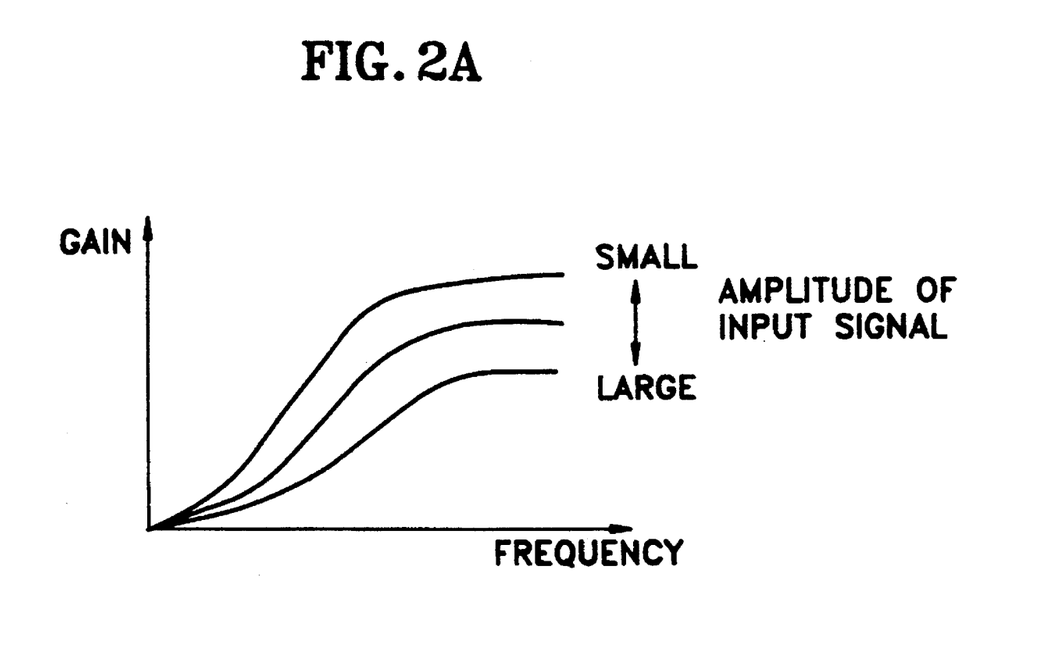
FIG. 2A illustrates the frequency versus gain characteristic of the non-linear pre-emphasis portion shown in FIG. 1.

The frequency versus gain characteristic of non-linear pre-emphasis portion 12 varies according to the amplitude of the input signal, as shown in FIG. 2A. That is, at higher input signal amplitudes the degree of high frequency emphasis is reduced, while at lower input signal amplitudes the degree of high frequency emphasis is increased.

Non-linear pre-emphasis portion 12 improves the S/N ratio of the high frequency components of the video signal, which greatly affects image resolution and, thus, improves the S/N ratio and the contours, i.e., distinctness, of the reproduced image.

Figure 2B:
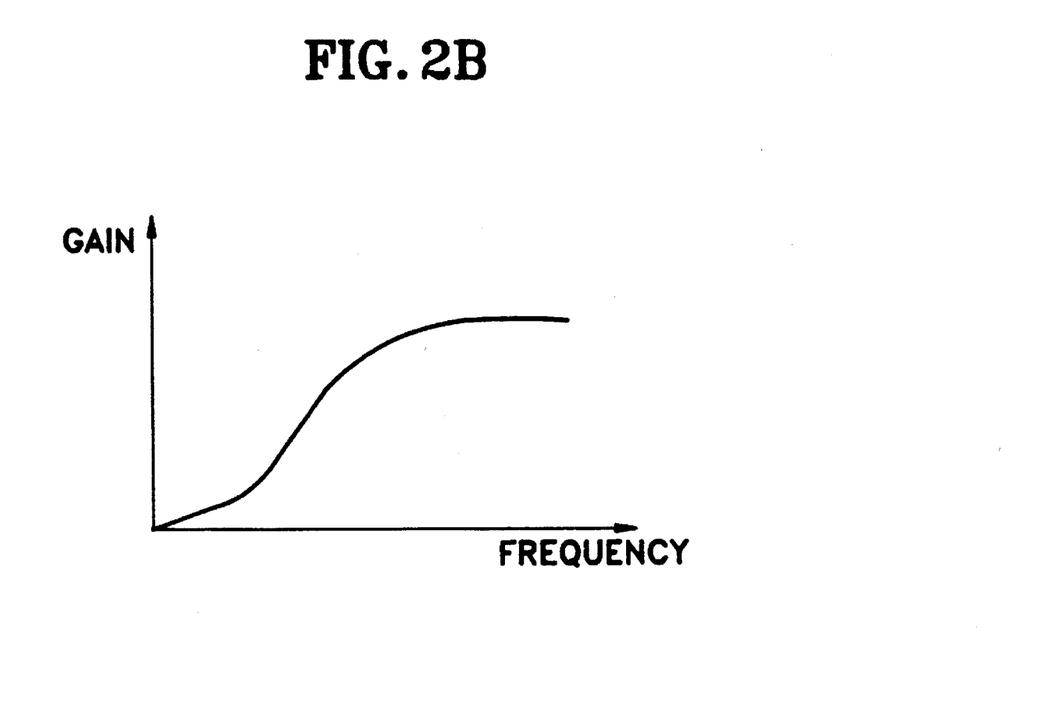
FIG. 2B illustrates the frequency versus gain characteristic of the main pre-emphasis portion shown in FIG. 1.

On the other hand, main pre-emphasis portion 16 changes the frequency characteristic of the signal output from adder 14 by varying an internal time constant. Main pre-emphasis portion 16 prevents degradation of the S/N ratio in a reproduced video signal during demodulation, e.g., the signal frequency modulated during recording or transmission. The frequency versus gain characteristic of main pre-emphasis portion 16 is shown in FIG. 2B. The frequency characteristic of the emphasized signal $S_{EMP}$ output by main emphasis portion 16 is determined according to the time constant.

Therefore, in VCRs where the luminance signal is frequency modulated prior to being recorded, pre-emphasis processing emphasizes the high frequency band whereby its amplitude is increased. When de-emphasis is performed after frequency-demodulation, by circuitry having the opposite characteristic to that of the pre-emphasis performed before modulation, the amplified high frequency band is restored to the original signal shape.

In recent years, part or all of the signal processing conventionally performed by analog circuitry is more frequently being performed by digital domain processing, for stabilizing and, thus, improving the S/N ratio of the VCR system.

When operating in the recording mode, the input analog video signal is converted into a digital signal and a variety of digital signal processing operations are performed during the recording process. It will be noted that digitized signal is converted back into an analog signal before being ultimately recorded onto the magnetic tape.

In contrast, during the reproducing mode, the analog video signal, after being reproduced from the magnetic tape, is converted into a digital signal which is then subjected to a variety of digital signal processing operations. Again, the digitized signal is converted back into an analog signal before being ultimately used, e.g., output as video signal to a display device. When the video signal is processed in digital form during the record/reproducing mode, the non-linear pre-emphasis and de-emphasis operations having opposite characteristics with respect to each other are performed by digital processing.

One digital non-linear emphasis/de-emphasis apparatus is disclosed in U.S. Pat. No. 4,849,826, wherein the passband of a high-pass filter for extracting the higher frequency components from the input signal varies according to the input signal characteristic and wherein feedback is provided from the output signal thereof. In this apparatus, non-linear input and output circuits having different coefficients of non-linearity are separately constructed for emphasis and de-emphasis. Input signal frequency characteristics must first be controlled before the gain is controlled. Therefore, the low frequency components having a small gain of the input signal are less emphasized than the high frequency components having a large gain thereof so that the gain of the low frequency components are not properly controlled, which inhibits accurate emphasis/de-emphasis control of the low frequency components with a small gain of the input signal.

Furthermore, a digital non-linear pre-emphasis technique is disclosed in U.S. Pat. No. 4,668,988, wherein the non-linear pre-emphasis circuit is constructed digitally such that system volume can be reduced while performance is enhanced. In the circuit, a desired frequency characteristic of a digital video signal is obtained by using a digital filter comprised of an adder, a delay, a counter and a subtractor. In addition, a ROM holding a data conversion table for non-linearly suppressing the amplitude of the digital video signal is utilized, so that data, whose amplitude corresponds non-linearly to that of the input signal, is added to the input digital video signal, which thereby results in an emphasis processing with respect to the amplitude of the input signal.

During pre-emphasis, input signals of the same frequency and amplitude should have equal frequency characteristics, without reference to a DC offset level. However, the above-described circuit exhibits different frequency response characteristics according to variation in the DC offset level.

SUMMARY OF THE INVENTION

Therefore, the principal object of the present invention is to provide a non-linear pre-emphasis apparatus capable of utilizing digital-processing in order to enhance the S/N ratio in one of recording/reproduction and transmission/reception processing.

Another object of the present invention is to provide a digital non-linear de-emphasis apparatus for restoring the digitally and non-linearly pre-emphasized signal to the original signal.

Yet another object of the present invention is to provide a digital non-linear pre-emphasis and de-emphasis apparatus for selectively performing non-linear pre-emphasis processing or non-linear de-emphasis processing.

Still another object of the present invention is to provide a digital non-linear pre-emphasis/de-emphasis apparatus for finely controlling the frequency response throughout the entire high frequency band of an input signal.

A still further object of the present invention is to provide a digital non-linear pre-emphasis/de-emphasis apparatus exhibiting equal frequency response characteristics for input signals having the same amplitude and frequency, without reference to their DC offsets.

These and other objects, features and advantages according to the present invention are provided by a non-linear pre-emphasis apparatus including:

a first filter for varying gain according to an amplitude of a high band component of an input digital signal;

a second filter for varying passband of the output signal of the first filter according to the amplitude; and a mixer for mixing the input digital signal with the output signal of the second filter to thereby produce a pre-emphasized signal in which the high band components of the input signal are emphasized.

These and other objects, features and advantages according to the present invention are provided by a digital non-linear de-emphasis apparatus for reproducing or receiving a pre-emphasized digital signal and then de-emphasizing the signal. The apparatus includes:

a subtractor for subtracting a de-emphasis amount from a pre-emphasized digital signal, for thereby restoring the signal to its original level;

a first filter for varying the gain of the output signal of the subtractor according to the amplitude of the high band components; and a second filter for varying the passband of the output signal of the first filter according to the amplitude thereof to thereby output the passband-varied signal as the de-emphasis amount to the subtractor.

These and other objects, features and advantages according to the present invention are provided by a digital non-linear pre-emphasis/de-emphasis apparatus for recording a digital video signal on a predetermined recording medium and reproducing the recorded digital signal. The apparatus advantageously includes:

a first switch having a first contact point which operates as an input port and a second contact point which operates as an output port for selecting the corresponding contact point to be connected under the control of a predetermined record/reproduction mode signal;

a second switch having a third contact point which operates as an output port and a fourth contact point which operates as an input port for selecting the corresponding contact point to be connected under the control the mode signal;

an automatic operator connected between the first and the second switches for selectively adding and subtracting an input signal with an emphasis amount which are input through the first and the second switches respectively, under the control of the mode signal;

a first filter for varying the gain of input signal according to the amplitude of the signal which is input via the first switch or the arithmetic operator; and a second filter for varying the passband of the output signal of the first filter according to the amplitude thereof, to thereby output the passband-varied signal as the emphasis amount to the operator.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 3:
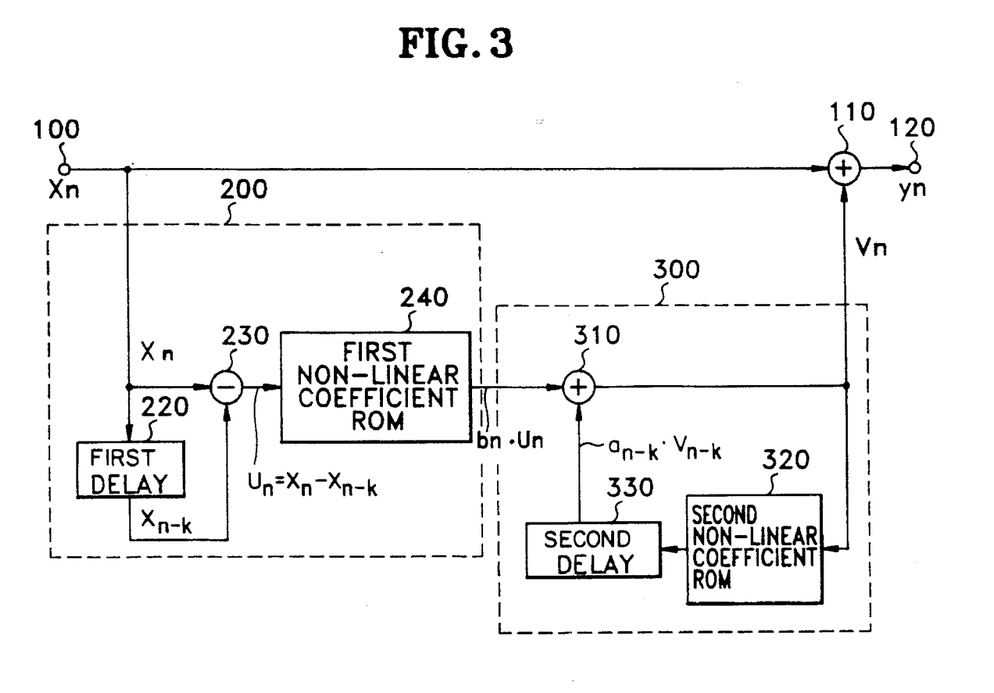
FIG. 3 is a block diagram showing a digital non-linear pre-emphasis apparatus according to the present invention.

FIG. 3 is a block diagram showing the digital non-linear pre-emphasis apparatus according to an embodiment of the present invention, wherein the apparatus includes a first filter 200 for varying the gain of a digital video signal $x_n$ received via input port 100, a second filter 300 for varying the passband of the output signal of first filter 200, and an adder 110 for adding the output signal $v_n$ of second filter 300 to the input signal $x_n$ received at input port 100 to thereby produce a pre-emphasized signal $y_n$ whose frequency versus gain characteristic varies according to the input signal amplitude.

More specifically, first filter 200 includes a first delay 220 for delaying the input digital video signal $x_n$ from input port 100 for a predetermined time, a subtractor 230 for obtaining a difference component $u_n$ between input digital video signal $x_n$ and the output signal $x_{n-k}$ and a first non-linear coefficient ROM 240 for multiplying the difference component $u_n$ output from subtractor 230 by a non-linear coefficient $b_n$ to thereby obtain a signal having a value of $u_n \cdot b_n$.

Second filter 300 advantageously includes an adder 310 for adding the signal $u_n \cdot b_n$ output from first non-linear coefficient ROM 240 with a signal $v_{n-k} \cdot a_{n-k}$ output from second delay 330, to thereby output the summed result $v_n$, a second non-linear coefficient ROM 320 for multiplying the output signal of adder 310 by a non-linear coefficient $a_n$ to thereby obtain the value $a_n \cdot v_n$ which determines the passband of the input signal, and a second delay 330 for delaying the output signal $a_n \cdot v_n$ of second non-linear coefficient ROM 320 for a predetermined period of time and providing the delayed signal $a_{n-k} \cdot v_{n-k}$.

The operation of the circuit shown in FIG. 3 will now be described with reference to FIGS. 3 through 6.

In FIG. 3, input digital video signal $x_n$, which is received at input port 100 during recording is simultaneously supplied to adder 110 and first filter 200. Preferably, input digital video signal $x_n$ is standardized before being input, so that a digitized video signal is received. Signal $x_n$ input to first filter 200 is applied to subtractor 230 and first delay 220, respectively.

First delay 220 of first filter 200 delays the digital video signal $x_n$, which is received via input port 100 for a predetermined time k and outputs the delayed signal $x_{n-k}$ to subtractor 230.

Preferably, subtractor 230 calculates the difference component $u_n$ between input signal $x_n$ and output signal $x_{n-k}$ from first delay 220, respectively. First non-linear coefficient ROM 240 checks each difference component $u_n$ output from subtractor 230 and multiplies the input signal $u_n$ by a coefficient $b_n$ which advantageously varies non-linearly according to the amplitude of the difference signal $u_n$, to thereby obtain the gain value with respect to the input signal. That is, as the amplitude of the input signal becomes smaller, first non-linear coefficient ROM 240 produces a resultant product in which the input signal is multiplied by a larger coefficient.

Adder 310 of second filter 300 adds the output signal $u_n \cdot b_n$ of first non-linear coefficient ROM 240 of first filter 200 to the output signal $a_{n-k} \cdot v_{n-k}$ of second delay 330, and sends the resultant sum $v_n$ to both adder 110 and second non-linear coefficient ROM 320. Preferably, non-linear coefficient ROM 320 checks output signal $v_n$ of adder 310 and then multiplies the input signal $v_n$ by the coefficient $a_n$, thus advantageously which varies non-linearly according to the amplitude of signal $v_n$ indicating the emphasis amount to thereby determine the passband of the input signal. More specifically, second non-linear coefficient ROM 320 produces a resultant product $a_n \cdot v_n$ in which the input signal is multiplied by a larger coefficient as the amplitude of input signal becomes smaller.

When the output signal $a_n \cdot v_n$ of second non-linear coefficient ROM 320 is input to second delay 330, second delay 330 supplies the previously stored signal $a_{n-k} \cdot v_{n-k}$ to adder 310, thereby completing a feedback loop.

Adder 110 adds digital video signal $x_n$ being input via input port 100 to the output signal $v_n$ from adder 310 of second filter 300, to thereby produce an output pre-emphasized signal $y_n$ via an output port 120.

The above-described pre-emphasized signal $y_n$ satisfies the following equations:

$$y_n = x_n + v_n \tag{1}$$

$$u_n = x_n - x_{n-k} \tag{2}$$

$$v_n = b_n \cdot u_n + a_{n-k} \cdot v_{n-k} \tag{3}$$

$$y_n - x_n = b_n \cdot u_n + a_{n-k}(y_{n-k} - x_{n-k}) \tag{4}$$

$$y_n = (1+b_n)x_n - (a_{n-k}+b_n)x_{n-k} + a_{n-k} \cdot y_{n-k} \tag{5}$$

where $x_n$ is an input signal at time n, $y_n$ is an output signal, $v_n$ and $u_n$ are parameters, and $a_n$ and $b_n$ are functions of $v_n$ and $u_n$, respectively.

On the other hand, the system function of the pre-emphasis satisfies the following equation:

$$H_{em}(Z) + 1 + H_1(z) \tag{6}$$

where $H_{em}(z)$ is a system function of pre-emphasis, and $H_1(z)$ is a system function passing through first and second filters 200 and 300.

Figure 4A:
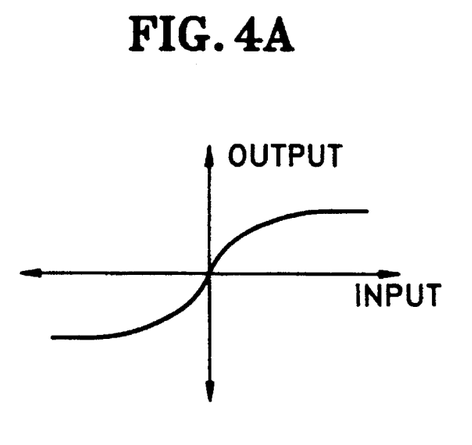
FIG. 4A is a graph showing the input-to-output relationship of the first non-linear coefficient ROM shown in FIG. 3.

FIG. 4A is a graph showing the input-output relationship of first non-linear coefficient ROM 240 shown in FIG. 3. The result is shown in which the coefficients vary non-linearly according to the input signal amplitude are multiplied by the input signal itself.

Figure 4B:
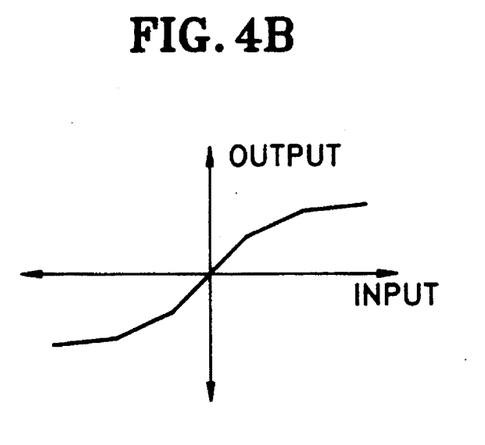
FIG. 4B is a graph showing the input-to-output relationship of the second non-linear coefficient ROM shown in FIG. 3.

FIG. 4B is a graph showing the input-output relationship of second non-linear coefficient ROM 320 shown in FIG. 3. The result is shown in which the coeffients varying non-linearly according to the input signal amplitude are multiplied by the input signal itself.

Figure 5A:
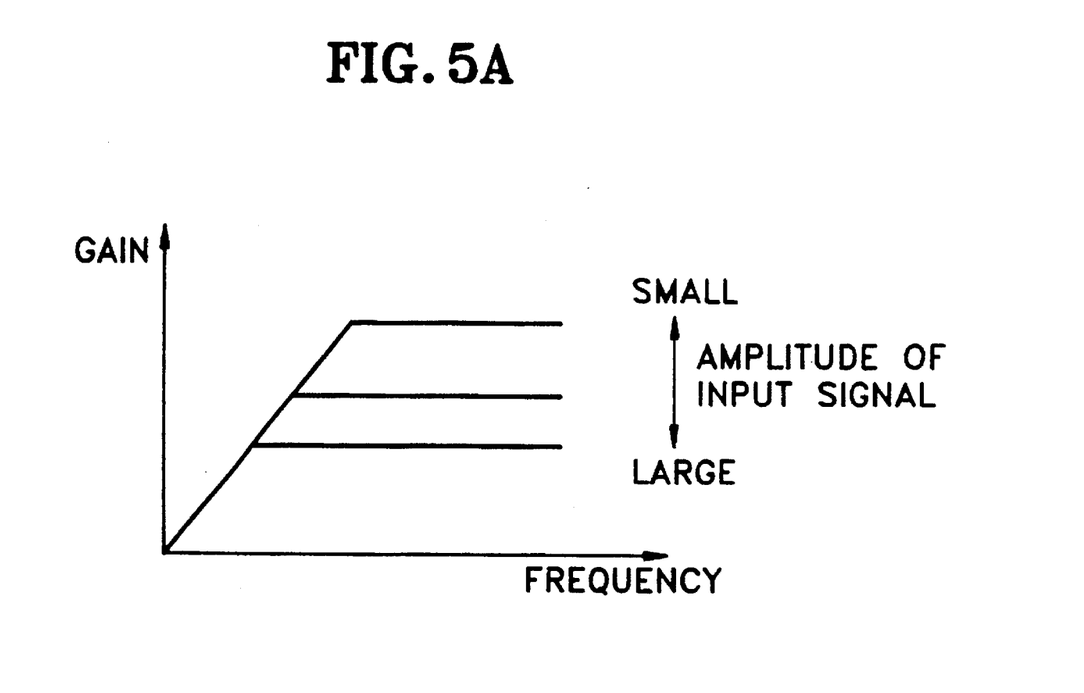
FIG. 5A is a graph showing the frequency-to-gain characteristic of the first filter 200 shown in FIG. 3.

FIG. 5A is a graph showing the frequency-to-gain characteristic of the output signal of first filter 200 of FIG. 3. First filter 200 is for varying the gain of the input signal, and is comprised by a finite impulse response (FIR) filter. The gain of first filter 200 in a fixed passband is changed by means of the output of first non-linear coefficient ROM 240.

That is, as the amplitude of the input signal becomes greater, the gain decreases. On the contrary, as the amplitude of the input signal becomes smaller, the gain increases.

Figure 5B:
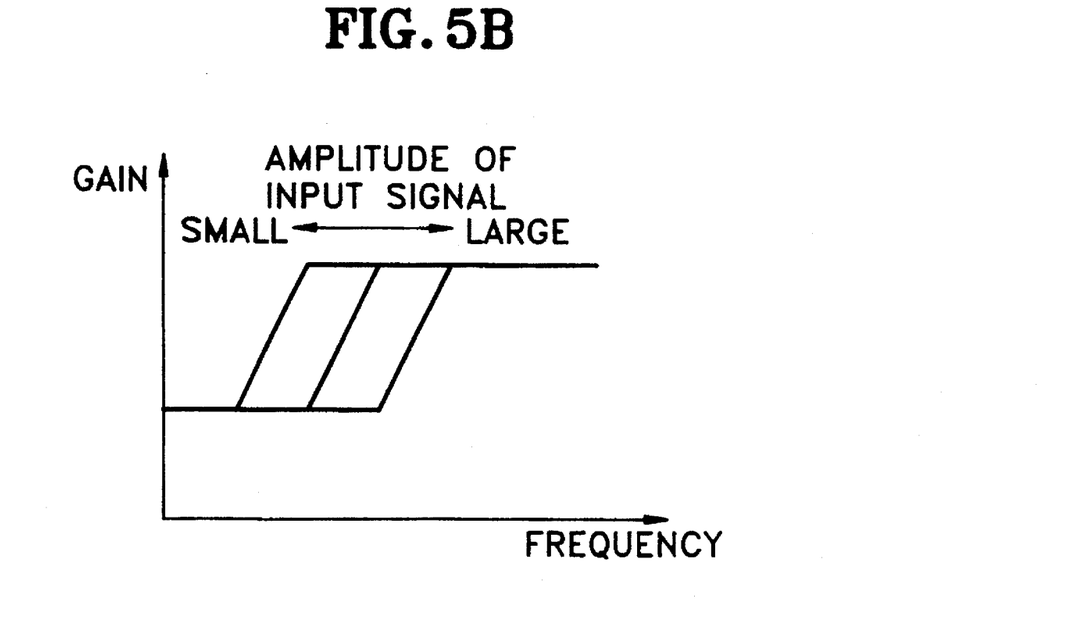
FIG. 5B is a graph showing the frequency-to-gain characteristic of the second filter 300 shown in FIG. 3.

FIG. 5B is a graph showing the frequency-to-gain characteristic of the output signal of second filter 300 shown in FIG. 3. Second filter 300 is for varying the frequency characteristic of the output signal of first filter 200, and is comprised by an infinite impulse response (1lR) filter. The frequency characteristic of second filter 300 is changed by means of the output of second non-linear coefficient ROM 320. That is, a frequency characteristic is obtained in which the passband changes according to the coefficient which is non-linearly determined according to the input signal amplitude.

Figure 6:
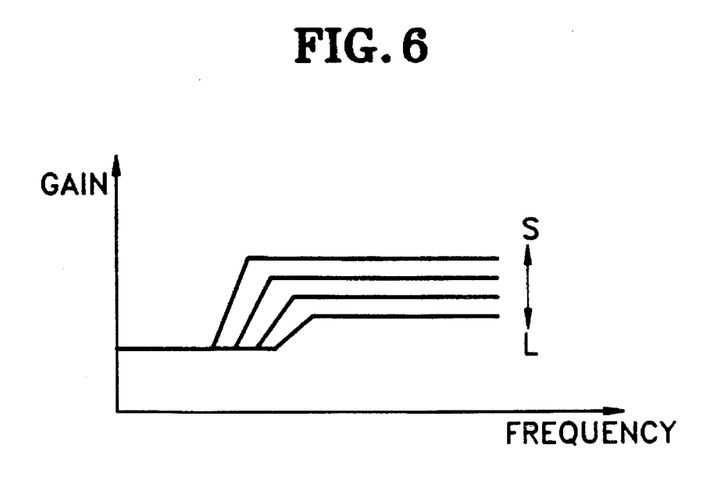
FIG. 6 is a graph showing the frequency-to-gain characteristic of the input signal applied at adder 110 shown in FIG. 3.

FIG. 6 is a graph showing the frequency-to-gain characteristic of adder 110 shown in FIG. 3. As the amplitude of the input signal at high-band frequencies becomes smaller, the gain becomes larger.

Figure 7:
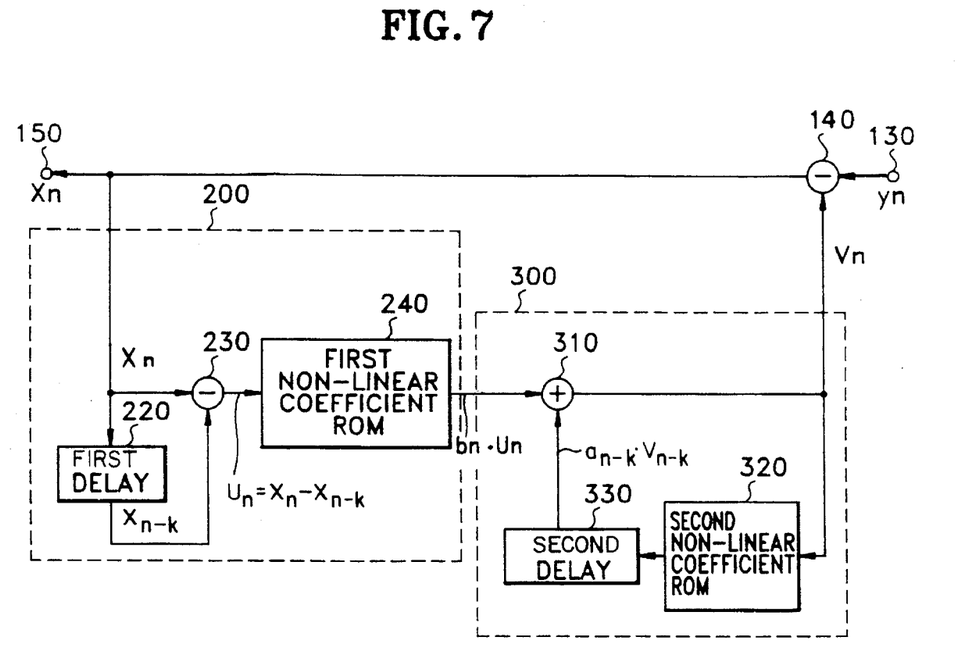
FIG. 7 is a block diagram showing a digital non-linear de-emphasis apparatus according to another embodiment of the present invention.

FIG. 7 is a block diagram showing a digital non-linear de-emphasis apparatus according to an embodiment of the present invention. In FIG. 7, like portions performing like operations as in the pre-emphasis apparatus shown in FIG. 3 are denoted by the same reference numerals, and will not be described further.

Comparing the apparatus of FIG. 7 with that of FIG. 3, a subtractor 140 is used instead of adder 110 (FIG. 3), which receives a pre-emphasized signal $y_n$ via input port 130 and subtracts therefrom the high-band component signal $v_n$ being output from adder 310 of second filter 300, to thereby restore the pre-emphasized signal to the original signal $x_n$ which is then supplied to an output port 150 and first filter 200.

Next, the operation of the de-emphasis circuitry illustrated in FIG. 7 will now be described. In to FIG. 7, a digital video signal $y_n$ in which the high-band components are pre-emphasized is received via input port 130, i.e., while performing a reproducing operation. Subtractor 140 receives pre-emphasized signal $y_n$ through input port 130, and receives signal $v_n$ indicating the emphasis amount from adder 310 of second filter 300, to thereby obtain the difference component $x_n$ between input signal $y_n$ of input port 130 and output signal $v_n$ of adder 310.

The output signal $x_n$ of subtractor 140 is sent to output port 150 as well as to first delay 220 and subtractor 230 of first filter 200, respectively. First delay 220 stores the de-emphasized signal $x_n$ which is received from subtractor 140, for a predetermined time, delays the signal, and supplies the delayed signal $x_{n-k}$ to subtractor 230.

Subtractor 230 determines difference component $u_n$ between the output signals $x_n$ and $x_{n-k}$ each having been output from subtractor 140 and first delay 220, respectively.

First non-linear coefficient ROM 240 checks the amplitude of the output signal $u_n$ of subtractor 230, and multiplies the output signal $u_n$ by a non-linear coefficient $b_n$ responsive thereto, to thereby change the gain value of the output signal $u_n$. Preferably, first filter 200 operates as an FIR filter.

Adder 310 of second filter 300 adds the input signal $u_n \cdot b_n$ whose gain value has been changed, from first non-linear coefficient ROM 240 of first filter 200, to the output signal $a_{n-k} \cdot v_{n-k}$ of second delay 330, to thereby provide the summed result $v_n$ for subtractor 140 and second non-linear coefficient ROM 320, respectively.

Second non-linear coefficient ROM 320 checks the amplitude of signal $v_n$ which is output from adder 310, and thereby outputs a product result $v_n \cdot a_n$, where $a_n$ is a non-linear coefficient responsive to the amplitude of signal $v_n$.

Second delay 330 stores signal $v_n \cdot a_n$ an which is output from second non-linear coefficient ROM 320, for a predetermined time, and supplies the previously stored signal $v_{n-k} \cdot a_{n-k}$ to adder 310, which therefore completes the feedback loop. Preferably, second filter 300 operates as an IIR filter, which provides an accurate frequency response characteristic in the combination of the input data, preceding input data and preceding output data. Therefore, a de-emphasized signal $x_n$ is output from output port 150.

The pre-emphasis and de-emphasis should have the opposite characteristics with respect to each other, so that the system function of de-emphasis is expressed as follows:

$$H_{dm}(z) = \frac{1}{H_{em}(Z)} = \frac{1}{1 + H_1(Z)} \qquad (7)$$

Figure 8:
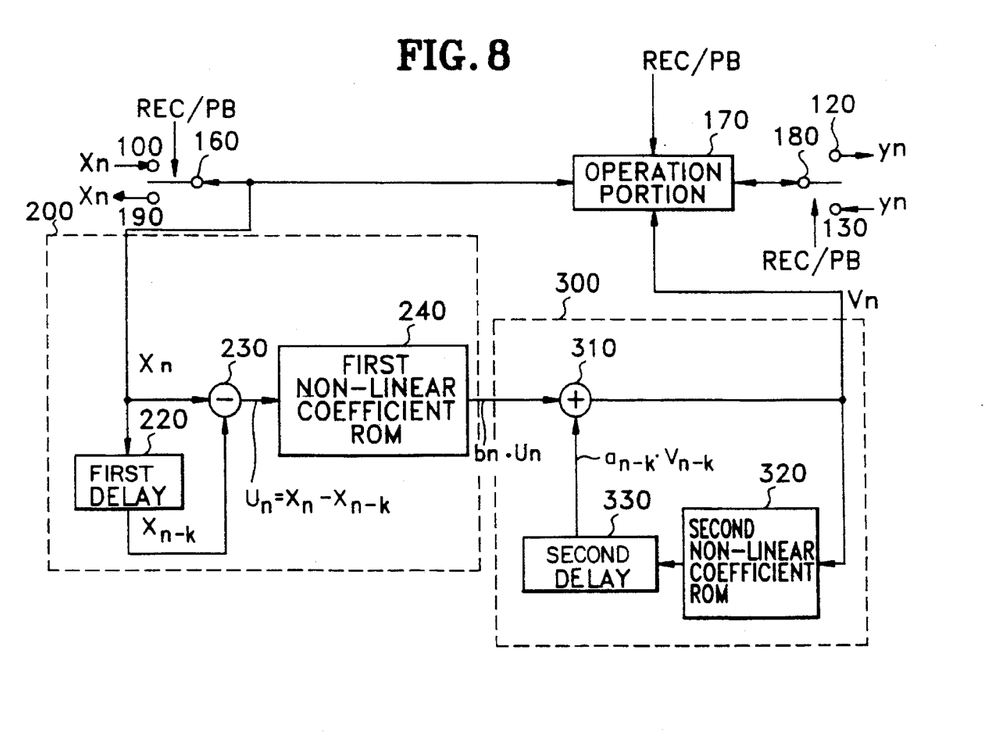
FIG. 8 is block diagram showing a combination digital non-linear pre-emphasis and de-emphasis apparatus according to still another embodiment of the present invention.

FIG. 8 is a block diagram showing a digital non-linear pre-emphasis and de-emphasis apparatus according to an embodiment of the present invention.

In the apparatus of FIG. 8, like portions performing the same operations as in FIGS. 3 and 7 are denoted by the same reference numerals, and will not be further described in detail.

The apparatus shown in FIG. 8 is the same as those in FIGS. 3 and 7, except that it has a first switching portion 160 which has a first contact point 100 serving as an input port of the pre-emphasis apparatus while performing recording and a second contact point 190 serving as an output port of the de-emphasis apparatus while performing reproduction, to thereby selectively connect first switching portion 160 with the corresponding one of first and second contact points 100 and 190 according to a control signal record/playback (REC/PB) indicating a predetermined record/playback mode. Also provided is a second switching portion 180 which has a first contact point 120 serving as an output port of the pre-emphasis apparatus while performing recording and a second contact point 130 serving as an input port of the de-emphasis apparatus while performing reproduction, to thereby selectively connect second switching portion 180 with the corresponding one of first and second contact points 120 and 130 according to a record/playback mode signal REC/PB. An operation portion 170 is advantageously connected between first switching portion 160 and second switching portion 180 for serving as an adder while performing recording and as a subtractor while performing reproduction under the control of record/playback mode signal REC/PB.

As shown in FIG. 8, when recording the digital video signal onto a predetermined record medium, first switching portion 160 receives an externally supplied record mode signal REC and connects with first contact point 100, to thereby receive video signal $x_n$, which is intended to be recorded, through first contact point 100.

Input video signal $x_n$ is supplied to operation portion 170 and is also supplied to first delay 220 and subtractor 230 of first filter 200. First delay 220 stores the digital video signal $x_n$ output from first switching portion 160 for a predetermined time, delays the signal and supplies the delayed signal $x_{n-k}$ to subtractor 230.

Subtractor 230 calculates difference component $u_n$ between output signals and $x_{n-k}$ of first switching portion 160 and first delay 220.

First non-linear coefficient ROM 240 checks the difference component $u_n$ which is output from subtractor 230, multiplies the difference component by non-linear coefficient $b_n$ responsive thereto, and outputs the thus-obtained multiplication result $u_n \cdot b_n$ to adder 310 of second filter 300.

Adder 310 of second filter 300 adds the output of first non-linear coefficient ROM 240 and that of second delay 330 and produces the summed result $v_n$.

Second non-linear coefficient ROM 320 checks signal $v_n$ which is output from adder 310, multiplies the output signal $v_n$ by a non-linear coefficient value an responsive thereto, and outputs the thus-obtained multiplication result $v_n \cdot a_n$.

Second delay 330 stores the value $v_n \cdot a_n$ output by second non-linear coefficient ROM 320 until the next input value is received therefrom, and then sends the previously stored value $v_{n-k} \cdot a_{n-k}$ to adder 310, which therefore completes the feedback loop.

Operation portion 170 adds the digital video signal $x_n$ which is input through first switching portion 160 to the signal $v_n$ which is output from adder 310 of second filter 300, according to record mode signal REC, so as to produce a pre-emphasized signal $y_n$ wherein the high-band components of the input signal $x_n$ are pre-emphasized.

Second switching portion 180 connects with first contact point 120 according to record mode signal REC and outputs the pre-emphasized signal $y_n$ which is output from operation portion 170, through first contact point 120.

On the contrary, in the case that a recorded signal is being reproduced from the predetermined record medium, second switching portion 180 connects with second contact point 130 according to an externally supplied playback mode signal PB, and receives the pre-emphasized signal $y_n$ via second contact point 130, which is acting as an input port.

Operation portion 170 subtracts signal $v_n$ which is output from adder 310 of second filter 300 from pre-emphasized signal $y_n$ which is input from second switching portion 180, according to playback mode signal PB, so as to produce a signal wherein the high-band components of the input signal $y_n$ are suppressed, i e., de-emphasized, to restore the original signal $x_n$.

The output signal $x_n$ of operation portion 170 is sent to first switching portion 160 and to first delay 220 and subtractor 230 of first filter 200.

First delay 220 of first filter 200 stores the signal $x_n$ which is output from operation portion 170 for a predetermined time, and then provides the previously stored signal $x_{n-k}$ to subtractor 230.

Subtractor 230 obtains difference component un between output signals $x_n$ and $x_{n-k}$ which come from operation portion 170 and first delay 220, respectively.

First non-linear coefficient ROM 240 checks the amplitude of the output signal $u_n$ of subtractor 230, multiplies the signal $u_n$ by the non-linear coefficient $b_n$ responsive thereto, and outputs the thus-obtained multiplication result $u_n \cdot b_n$ to adder 310 of second filter 300.

Adder 310 of second filter 300 sums the output signals of first non-linear coefficient ROM 240 and second delay 330 to thereby determine the emphasis amount $v_n$ added to the input signal $x_n$ during pre-emphasis processing.

Second non-linear coefficient ROM 320 checks the amplitude of the output signal $v_n$ from adder 310, multiplies the output signal $v_n$ by the non-linear coefficient $a_n$ responsive thereto, and outputs the multiplied result $a_n \cdot v_n$ to second delay 330. Second delay 330 stores the output signal $a_n \cdot v_n$ of second non-linear coefficient ROM 320 and simultaneously outputs the previously stored signal $a_{n-k} \cdot v_{n-k}$ to adder 310, which therefore completes the feedback loop.

First switching portion 160 connects with second contact point 190 according to playback mode signal PB and, using second contact point 190 as an output port, outputs the signal $x_n$ which is output from operation portion 170.

The present invention can be applied to any system which requires a filter whose system frequency response characteristic varies non-linearly according to the input signal amplitude.

As described above, the digital non-linear pre-emphasis/de-emphasis apparatus according to the present invention multiplies the input signal by a coefficient which varies non-linearly according to the input signal amplitude, to thereby adjust the gain of the input signal. It will be noted that the passband of the gain-controlled input signal is determined according to a non-linear coefficient value. Therefore, the S/N ratio of the system and the stability thereof are improved, and finer pre-emphasis/de-emphasis operations can be performed with respect to the lower high-frequency signal components.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A digital non-linear pre-emphasis apparatus comprising:

a first filter for varying the gain of an input digital signal according to an amplitude of a high band component of said input digital signal thereby generating a gain-varied output signal;

a second filter for varying a passband of said gain-varied output signal according to said amplitude of said gain-varied output signal to thereby generate a passband-varied output signal; and a mixer for mixing said input digital signal with said passband-varied output from said second filter to thereby produce a pre-emphasized signal wherein said high band components of said input digital signal are emphasized.

2. The digital non-linear pre-emphasis apparatus as claimed in claim 1, wherein said first filter comprises:

a first delay element delaying said input digital signal for a predetermined time period and generating a first delayed signal;

a subtractor for obtaining a difference between said input digital signal and said first delayed to thereby generate a first difference signal; and a first non-linear processor for multiplying said first difference signal by a predetermined non-linear coefficient corresponding thereto to thereby generate a resultant multiplication product.

3. The digital non-linear pre-emphasis apparatus as claimed in claim 2, wherein said second filter comprises:

a second delay element for delaying a signal input thereto for a second predetermined time period to thereby generate a second delayed signal;

an adder for adding said product provided by said first non-linear processor to said second delayed signal generated by said second delay element to thereby produce a resultant sum corresponding to an emphasis amount; and a second non-linear processor for examining the amplitude of the emphasis amount output from said adder, for multiplying said emphasis amount by a non-linear coefficient corresponding thereto, and for generating a second resultant product applied as an input signal to said second delay element.

4. A digital non-linear pre-emphasis apparatus comprising:

a first high-pass filter comprising a finite impulse response filter for detecting high band components of an input digital signal;

a non-linear coefficient processor for multiplying said input digital signal by a first non-linear coefficient responsive to amplitude of detected said high-band components so as to change gain of said input digital signal to thereby output a gain-varied signal;

a second high-pass filter receiving said gain-varied signal comprising an infinite impulse response filter for multiplying said gain-varied signal by a second non-linear coefficient responsive to an amplitude thereof to thereby change a passband thereof so as to output a passband-varied signal; and an arithmetic operator for adding said input digital signal to said passband-varied signal to thereby generate a pre-emphasized signal according to a predetermined operation.

5. A digital non-linear de-emphasis apparatus for de-emphasizing a pre-emphasized digital signal, comprising:

a first subtractor for subtracting a de-emphasis amount from said pre-emphasized digital signal to thereby restore the pre-emphasized signal to an original non-emphasized signal level as an original signal;

a first filter for varying gain of said pre-emphasized signal according to an amplitude of high band components of said original signal, to produce a gain varied signal;

a second filter for varying a passband of said gain-varied signal according to amplitude thereof to thereby output a resultant passband-varied signal representing said de-emphasis amount to said first subtractor.

6. A digital non-linear de-emphasis apparatus as claimed in claim 5, wherein said first filter comprises:

a first delay element for delaying said original signal for a predetermined time period to thereby output a first delayed signal;

a second subtractor for obtaining a difference between said original signal and said first delayed signal and to thereby output a first difference signal; and a first non-linear processor for examining amplitude of said first difference signal of said second subtractor and for multiplying said first difference signal by a first non-linear coefficient corresponding thereto, to thereby vary gain of said first difference signal and output a gain-varied signal.

7. A digital non-linear de-emphasis apparatus as claimed in claim 6, wherein said second filter comprises:

second delay element for delaying said gain-varied signal for a predetermined second time to thereby output a second delayed signal;

an adder for adding said gain-varied signal from said first non-linear processor to said second delayed signal to thereby output the result and sum as said the de-emphasis amount to said first subtractor; and a second non-linear processor for examining amplitude of the resultant sum of said adder, multiplying said resultant sum by a second non-linear coefficient corresponding thereto, and for providing multiplied resultant product as an input signal to said second delay element.

8. A digital non-linear de-emphasis apparatus for de-emphasizing a pre-emphasized digital input signal, comprising:

a subtractor for subtracting a de-emphasis amount from the pre-emphasized digital input signal, for restoring the pre-emphasized digital input signal to an original signal having a non-emphasized digital signal form and providing said original signal;

a first high-pass filter comprising a finite impulse response filter for detecting an amplitude of high-band components of the original signal output from said subtractor;

a non-linear coefficient processor for multiplying a pre-emphasized digital input signal based on said original signal by a first non-linear coefficient responsive to the detected amplitude of said high-band components of said original signal to thereby change the gain of said pre-emphasized digital input signal to thereby output a gain-varied pre-emphasized digital signal as a gain-varied signal; and a second high-pass filter comprising an infinite impulse response filter for multiplying the gain-varied signal of said non-linear coefficient processor by a second non-linear coefficient responsive to the amplitude thereof for changing a passband thereof so as to output a passband-varied output signal corresponding to said de-emphasis amount to said subtractor.

9. A digital non-linear pre-emphasis/de-emphasis apparatus, comprising:

a first switch having a first contact point which serves as an input port during a recording mode and a second contact point which serves as an output port during a reproduction mode, said first switch selecting one of said first and second contact points to be connected according to a predetermined record/reproduction mode signal;

a second switch having a third contact point which serves as an output port during a recording mode and a fourth contact point which serves as an input port during a reproduction mode, said second switch selecting one of said third and fourth contact points to be connected according to said predetermined record/reproduction mode signal;

a selectable operator connected between said first and said second switches for adding during said recording mode and for subtracting during said reproduction mode an emphasis amount to, during said recording mode, and from, during said reproduction mode, the input signal which is input through one of said first and said second switches, according to said record/reproduction mode signal;

a first filter for varying gain of said input signal according to an amplitude of the signal which is input via one of said first and said second switches to output a said gain-varied signal; and a second filter for varying a passband of the output of said first filter according to an amplitude thereof, to thereby output a passband-varied signal corresponding to an emphasis amount to said selective operator.

10. A digital non-linear pre-emphasis/de-emphasis apparatus as claimed in claim 9, wherein said first filter comprises:

a first delay for delaying said input signal of said first switch during said recording mode, or said operation during said reproduction mode, for a predetermined time period to thereby generate a first delayed signal;

a subtractor for obtaining a difference between said input signal and said first delayed signal for generating a difference signal; and a first non-linear processor for multiplying said difference signal by a first non-linear coefficient corresponding to the amplitude of said input difference signal, to thereby output a multiplied first result.

11. A digital non-linear pre-emphasis/de-emphasis apparatus as claimed in claim 10, wherein said second filter comprises:

a second delay for delaying a signal input thereto for a second predetermined time period to provide a second delayed signal;

an adder for adding the first result of said first non-linear processor to said second delayed signal, to thereby output a resultant sum corresponding to said as emphasis amount with respect to said input signal to said operator; and a second non-linear processor for examining amplitude of the resultant sum of said adder and multiplying said resultant sum by a second non-linear coefficient corresponding to amplitude, to thereby output a second multiplied result to said second delay.

12. A digital non-linear pre-emphasis/de-emphasis apparatus, comprising:

a first switch having a first contact point which serves as an input port during a record mode and a second contact point which serves as an output port during a reproduction mode, said first switch selecting a corresponding contact point to be connected according to whether a predetermined record/reproduction mode signal indicates said record mode or said reproduction mode;

a second switch having a third contact point which serves as an output port during said record mode and a fourth contact point which serves as an input port during said reproduction mode, said second switch selecting a corresponding contact point to be connected according to whether said predetermined record/reproduction mode signal indicates said record mode or said reproduction mode;

a selectable operator connected between said first and said second switches for respectively, adding during said recording mode and for subtracting during said reproduction mode an emphasis amount to, during said recording mode, and from, during said reproduction mode, an input signal which is input through one of said first and said second switches, according to said record/reproduction mode signal;

a first high-pass filter comprising a finite impulse response filter for detecting high-band components of a digital signal which is input via said first switch or said second switch;

a first non-linear coefficient processor for multiplying said input digital signal by a first non-linear coefficient responsive to an amplitude of the detected said high-band components thereof to thereby change the gain thereof so as to output a gain-varied signal; and a second high-pass filter comprising an infinite impulse response filter for multiplying an output of said first non-linear coefficient processor by a second non-linear coefficient responsive to respective amplitudes to thereby vary a passband so as to generate a passband-varied signal corresponding to an emphasis amount provided to said operator.

* * * * *